United States Patent [19]
Johnston et al.

[11] 3,806,834
[45] Apr. 23, 1974

[54] STARK-EFFECT MODULATION OF $CO_2$ LASER WITH $NH_2D$

[75] Inventors: Alan R. Johnston, La Canada; Richard D. S. Melville, San Marino, both of Calif.

[73] Assignee: California Institute of Technology, Pasadena, Calif.

[22] Filed: July 6, 1972

[21] Appl. No.: 269,450

[52] U.S. Cl............... 332/7.51, 331/94.5, 350/150, 350/160, 423/352, 423/644
[51] Int. Cl............................................. H01s 3/22
[58] Field of Search.................. 332/7.51; 331/94.5; 350/150, 160 R; 423/352, 644

[56] References Cited
UNITED STATES PATENTS
2,714,660 8/1955 Hershberger ..................... 331/94.5

OTHER PUBLICATIONS
Landman et al., "Light Modulation by Means of the Stark Effect in Molecular Gases . . . to Carbon Dioxide Lasers," 12/1/69, pp. 357–360, A.P.L. Vol. 15, No. 11.
Landman, "Modulation of . . . by Electro–Optic Gases," 8/67, pp. 3668–3675, J. of A.P., Vol. 38, No. 9.
Brewer et al., "Analysis of Laser Spectroscopy of Ammonia," 3/1/70, pp. 2774–2775, J. of Chem. Phys., Vol. 52, No. 5.
Brewer et al., "Precision 1–R Stark Spectra of $N^{14}H_2D$ Using Lamb Dip," 9/5/69, pp. 559–563, Phys. Rev. Letters, Vol. 23, No. 11.

Primary Examiner—Benjamin A. Borchelt
Assistant Examiner—N. Moskowitz
Attorney, Agent, or Firm—Lindenberg, Freilich & Wasserman

[57] ABSTRACT

The molecular stark-effect in $NH_2D$ is used to modulate the $10.6\mu$, P(20) line of a $CO_2$ laser. A 25 cm cell external to the laser is filled with about equal parts of $NH_3$ and $ND_3$ to a total pressure between 2 and 10 torr. An equilibrium concentration of $NH_2D$ as high as 45 percent is rapidly achieved. The cell is biased with a DC field ($3.8 \pm 0.1$ KV/cm) and modulated with an AC signal of (about 20 V RMS). At a cell pressure of 4 torr, a modulation depth of 40 percent is achieved.

15 Claims, 5 Drawing Figures

STARK-EFFECT MODULATION OF $CO_2$ LASER WITH $NH_2D$

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to apparatus for modulation of a laser beam, and more particularly to an improved gas cell for modulating the strong $10.6\mu$, P(20) line of a $CO_2$ laser using the molecular Stark-effect of the gas in the cell.

A need exists in the communications art for ever wider transmission channels to convey greater amounts of information in real time. Wider transmission channels require higher carrier frequencies, and the laser beam therefore provides a promising vehicle for transmitting such vast amounts of information. Modulation of the laser beam to take advantage of its capabilities has been a challenge which has been met only in part.

Efforts to modulate laser beams have been directed to providing crystal devices which have been mounted within the laser cavity to obtain optimum efficiency. In-cavity modulation devices present fabrication problems, and optical absorptions in the modulator can markedly reduce the efficiency of the entire laser device.

Some efforts have been made to employ the Stark effect of a gas to modulate various $CO_2$ laser lines. The Stark-effect is the change in the spectrum of a molecule when it is subjected to an electric field. By applying a time-varying electric field, amplitude modulation has been achieved using for the gas a methylhalide or other gas, such as $NH_3$, $NF_3$, vinyl chloride, difluoroethylene and difluoroethane for different carbon dioxide lines.

An advantage of this technique for modulating a laser beam is low power for wide-band modulation at high frequencies in the order of 30 MHz. However, practical or commercial application of this technique has not been reached because of the low modulation depths which have been achieved with the gases known to exhibit the Stark-effect in the infrared region. Stark cells approximately 1 meter in length have been required in laboratory systems to achieve sufficient modulation depth to obtain experimental data. For practical applications, a greater modulation depth is necessary. The use of multiple passes through the Stark cell to increase the modulation depth has been suggested by P. C. Claspy and Yoh-Han Pao in "Basic Characteristics of High-Frequency Stark-Effect Modulation Vol. QE-7, No. 11, November 1971, pp. 512–519. However, that only adds complexity and increases the size of the cell which is already too large, particularly for such applications as communications with or through a space ship or a communications satellite.

Stark tuning into optical resonance of molecules in deuterated ammonia ($NH_2D$) has been investigated by Richard G. Brewer, et al., using a standing-wave $CO_2$ laser field to obtain a unique vibration-rotation line assignment and its transition matrix, and to probe ground-and excited-state Stark splittings with precision. This work, reported in "Precision Infrared Stark Spectra of No. 11, Sept. 15, 1969, pp. 559–563, stimulated the present invention, even though from that work it was not apparent how a high abundance of $NH_2D$ could be achieved in a Stark cell. There is some deuterium in natural ammonia (about 0.15% $NH_2D$), and a small degree of deuteration can be achieved with heavy water by a chemical process, but it has been discovered in this invention that a high abundance of about 45 percent of $NH_2D$ can be produced in a cell by mixing commercially available gases $NH_3$ and $ND_3$. This has permitted an external Stark cell to be used to achieve modulation depths to about 40 percent, whereas prior experiments with external Stark cells using other gases have yielded only about 5 percent modulation.

SUMMARY OF THE INVENTION

In accordance with the present invention, Stark-effect modulation of a $CO_2$ laser to high modulation depths is achieved in a short (about 25 cm) cell by mixing equal parts of $NH_3$ and $ND_3$. A DC bias field is applied to the cell using closely spaced plates parallel to the laser beam path through the cell and closely spaced in order to shift a Stark component of the $NH_2D$ into partial coincidence with the laser. For the strong $10.6\mu$ line of the $CO_2$ laser, a high voltage of about 3.8 V/cm is used. A modulating field is superimposed on the bias field to achieve frequency or amplitude modulation, or to achieve switching, such as Q switching, of the laser beam. The spacing between the field plates is reduced to prevent electrical sparking between the plates at the gas pressure (from 2 to 10 torr) used in the cell for optimum modulation depth. For the high bias of 3.8 V/cm, the spacing is about 1 mm. A modulating field of about 20 volts RMS is sufficient to achieve 40% modulation at 4 torr.

DESCRIPTION OF THE PREFERRED EMBODIMENTS

Figure 1:
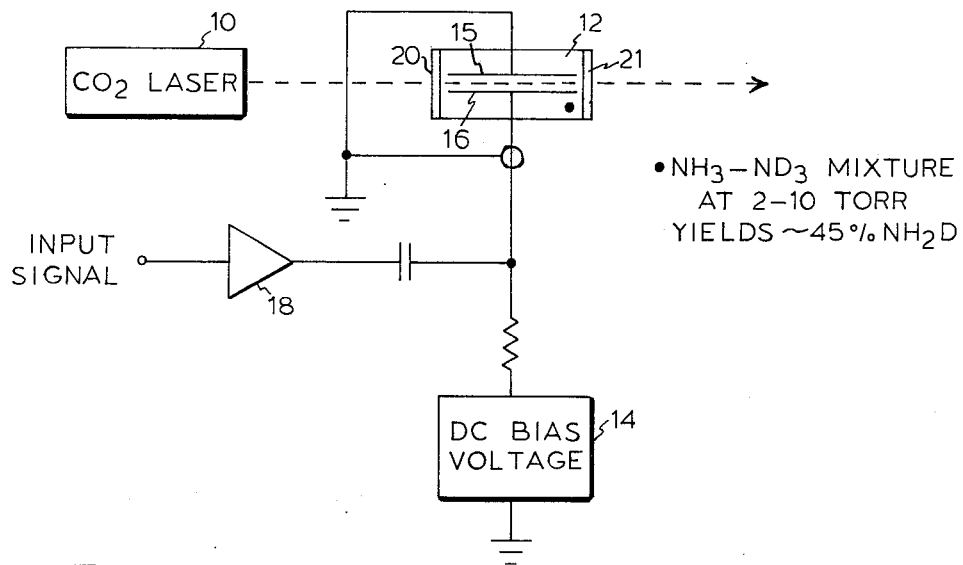
FIG. 1 is a schematic diagram of a $CO_2$ laser modulator according to the present invention.

Referring to FIG. 1, a wide-band modulator external to a $CO_2$ laser 10 is comprised of a Stark-effect cell 12 containing deuterated ammonia ($NH_2D$) to which a biasing field is applied by a DC voltage from a source 14 connected across plates 15 and 16. These plates are parallel to the laser beam, and closely spaced to form a gap on the order of 1 mm through which the laser beam passes. An AC modulating signal of about 20V RMS is superimposed on the DC bias through an amplifier 18. End windows 20 and 21 pass the laser beam with a minimum of attenuation in the infrared region of the $CO_2$ laser.

The cell 12 is about 20 cm, significantly shorter than the cells of about 1 meter which have been heretofore used to modulate a $CO_2$ laser using a methylhalide or other gas in the cell. Greater modulation depth of about 40 percent is achieved, as compared to about 5 percent in prior work using other gases, due to the high absorption of $NH_2D$.

The high absorption coefficient of $NH_2D$ molecules investigated by Brewer, et al, supra, would not be useful in a Stark cell unless the gas in the cell contains a high concentration of $NH_2D$ molecules. As noted hereinbefore, natural ammonia contains only about 0.45 percent of $NH_2D$. This low percentage of the deuterated ammonia molecule more than offsets the high absorption coefficient, and yields very small modulation depth, about 0.5 percent. The problem then is achieving a gas in the cell with a high concentration of deuterated ammonia molecules. It has been discovered that deuterium is exchanged freely between ammonia molecules, and that a high concentration (about 45 percent) of $NH_2D$ can be rapidly achieved by mixing $NH_3$ and $ND_3$ in approximately equal parts to a total pressure between 2 and 10 torr.

The $NH_2D$ absorption line involved was identified by Brewer, et al., supra, as belonging to the transition $(\nu_2, J_{K_{-1}K_1}) = (0_a, 4_{04}) \rightarrow (1_s, 5_{14})$. This transition is nearly in coincidence with, but at a lower frequency than the 944.191 $cm^{-1}$ P(20) line of the $CO_2$ laser. A relatively large and linear Stark-effect results from mixing of the rotation-inversion levels $4_{04}$ ($a$) and $4_{14}$ ($s$) in the lower state of the transition. Modulation is accomplished by biasing the $J=4$ Stark component into partial coincidence with the laser line with the DC field, upon which is superimposed the AC modulating field. The AC field changes the overlap between the absorbing line and the laser line, thus varying the gas cell transmission. The upper level of the transition also exhibits a small second order Stark-effect, but it does not contribute measurably to the observed effects.

The Stark-effect changes character as the frequency of the perturbing field becomes comparable to the line width, and the resultant modulator bandwidth limitation is expected. P. C. Claspy, in a Ph.D. thesis, Case Western Reserve University (1970), estimated that the bandwidth should be equal to the pressure broadened line width on the theoretical grounds. Therefore, in the present invention it is expected that the useful bandwidth will increase linearly with pressure, according to the pressure broadening coefficient. Note that there will be a compromise between the driving power requirement at a given frequency and bandwidth in this invention, since the broader line at higher pressures requires greater field variation for the same absorption change.

The following model for the transmission of an $NH_2D$ gas cell is found to be satisfactory. The transmission of a cell of length $l$ is given by $$I = I_0 e^{-\gamma l} \quad (1)$$

where $\gamma$ is the absorption coefficient of the gas, depending upon electric field as well as light frequency. In $NH_2D$, individual Stark components are completely resolved and can be considered individually. We will assume a Lorentzian line shape $$\nu = \gamma_H [CPb/(\epsilon^2 + b^2)] \quad (2)$$

where $\gamma$ = absorption coefficient. $\gamma_H$ = high pressure asymptotic value of the absorption coefficient at line center, a basic parameter of the gas. $C$ = pressure broadening coefficient. $P$ = pressure. $b$ = line width; we assume $b^2 = b_d^2 + (CP)^2$. $b_d$ is the doppler line width. $\epsilon$ = frequency offset of the line center from the laser frequency; $\epsilon = \epsilon_o + SE$. $S$ is the Stark coefficient relating line shift in frequency units to electric field and $E$ is the applied field. $\epsilon_o$ is a frequency offset which depends on the offset of the absorption line from the laser frequency at zero field.

This model is appropriate since the expected modulator application is in the pressure broadened region. Even at lower pressures, the important central portion of the doppler line shape differs only slightly from the pressure broadened profile, but the model would give too much absorption far from line center.

Figure 2:
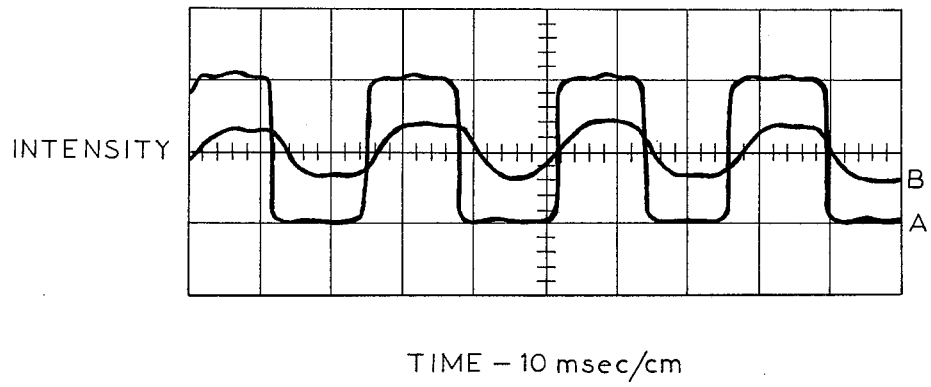
FIG. 2 shows for comparison chopper (100 percent) modulation of the P(20) line of a $CO_2$ laser, and Stark-effect modulation of the same line using $NH_2D$.

Line strength data were obtained using the technique described by Brewer, et al. Radiation from a $CO_2$ laser, one meter in length and tuned by means of a grating and cavity length to the 10.6$\mu$, P(20) line was passed through the Stark cell onto an $Sr_{0.25}Ba_{0.75}NiO_3$ (SBN) pyroelectric detector. A small sinusoidal probe field of constant amplitude at 400 Hz was applied to the cell as a larger DC bias field swept the line across the laser frequency. Since the 400 Hz component of the modulated laser intensity reaching the SBN detector is proportional to the slope of the absorption curve at a given bias point, an x-y plot of the modulated intensity vs. bias field provides a plot of the derivative of the Stark-shifted line profile. Given the cell geometry, probe field amplitude and the laser beam intensity, the line profile can be obtained from the derivative curves. The AC probe field must be small compared to the line width in order to avoid non-linear effects. A probe field of 25 V $cm^{-1}$ RMS was found to be sufficiently small to avoid inaccuracy. The laser intensity was measured relative to the probe-field-modulated intensity by mechanically chopping the beam at 400 Hz with the gas cell quiescent and recording the resultant detector output on the same x-y recorder. A portion of the laser beam was diverted to a spectrometer prior to reaching the gas cell, so that a continuous monitor was maintained on the laser output. FIG. 2 shows a curve A the chopper (100 percent) modulation and in curve B the field modulation for comparison. This shows field modulation of about 40 percent can be achieved with a Stark cell.

The Stark cell was a glass cylinder containing polished aluminum plates 19.7 cm long, 2.5 cm wide and separated 0.109 ± 0.003 cm by means of glass spacers. The edges of the plates were rounded to discourage breakdown of the sample gas. End windows were of NaCl.

The $NH_2D$ was obtained by mixing $NH_3$ and a commercially prepared sample of $ND_3$ in the cell. Exchange of hydrogen and deuterium is rapid; the equilibrium concentration of $NH_2D$ was obtained in less then 1 minute. The proportion of $ND_3$ in the mixture was determined by pressure measurement during the filling process. A mass spectrometer analysis of the 40 percent $NH_3$ mixture showed that it contained 45% ± 10% $NH_2D$. A similar analysis indicated that the $ND_3$ sample used to prepare the 40 percent mixture in fact contained only 69% $ND_3$. The other mixtures were prepared from a different sample of $ND_3$, and no analysis was made of their composition.

Figure 3:
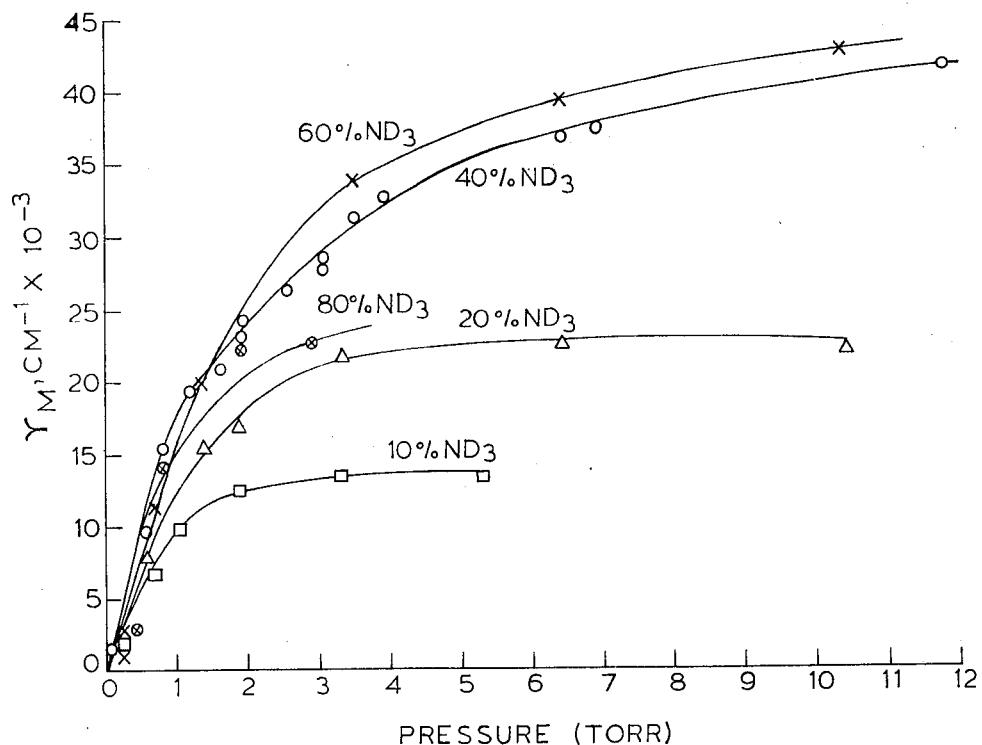
FIG. 3 shows a graph of absorption at line center as a function of pressure in several mixtures of $ND_3$ and $NH_3$.
Figure 4:
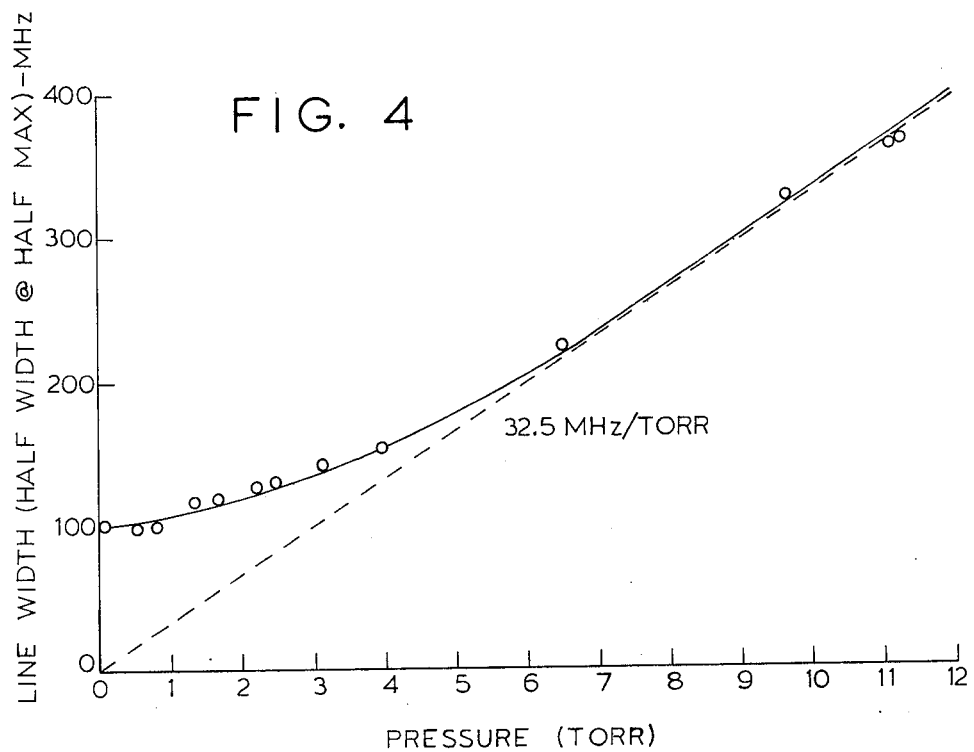
FIG. 4 is a graph of linewidths vs. pressure which is independent of $NH_2D$ concentration.

FIG. 3 shows experimental $Y_M$ vs pressure for several gas mixtures. $Y_M$ is the absorption coefficient at line center. FIG. 4 shows line width vs. pressure, and as expected, is independent of the $ND_3$ concentration. Both of these figures were obtained from the experimental data using the approximate model described above and apply specifically to the $M = 4$ Stark component. A comparison may be made between our line strengths as determined in the pressure broadened region, and a value at $36\mu$ given by R. G. Brewer and J. D. Swalen, J. Chem. Phys., Vol. 52, No. 5, Mar. 1, 1970, pp. 2774–2775, using Equation 2. We find a smaller absorption by a factor of 20. The limiting line width at low pressure shown in FIG. 4 is wider than the calculated doppler width of 41 MHz because of non-uniform plate spacing.

Placing the line width on a frequency scale requires independent knowledge of the applicable Stark tuning coefficient, S. A value of S which has been established for $NH_3$ by means of microwave spectroscopy is 0.568 MHz cm volt$^{-1}$. The isotope shift is not expected to be large, but no direct determination is available for $NH_2D$. Coincidence between the $M = 4$ Stark line center and the P(20) $CO_2$ line occurs at $E = 3.8 \pm 0.1$ kV/cm. The radiation flux in the Stark cell was maintained well below 1 watt/cm$^2$ in this experiment in order to avoid saturation effects.

The parameters $Y_M$ and C for the gas mixture used are found to be $Y_M = 0.033$ cm$^{-1}$, $C = 32$ MHz-torr$^{-1}$. Using Equations 1 and 2 above, the maximum intensity modulation to be expected in a 19.7 cm cell with 20V RMS applied signal can be calculated in a straightforward way. The result is $dI/I_o = 48$ percent, which is in good agreement with the observed 40 percent of FIG. 2.

To show the variation in modulator performance with respect to pressure (for low power applications), the experimental data given above and the absorption line model (Equation 2) give the following parameters for a modulator using 45% $NH_2D$ and capable of 50 percent modulation ($Y_M l = 1$) of the $10.6\mu$, P(20) line of the $CO_2$ laser:

| Pressure (torr) | Modulating Voltage (VRMS) | Modulator Length (cm) |
|---|---|---|
| 4 | 21 | 27 |
| 6 | 28 | 24 |
| 10 | 44 | 21 |

Figure 5:
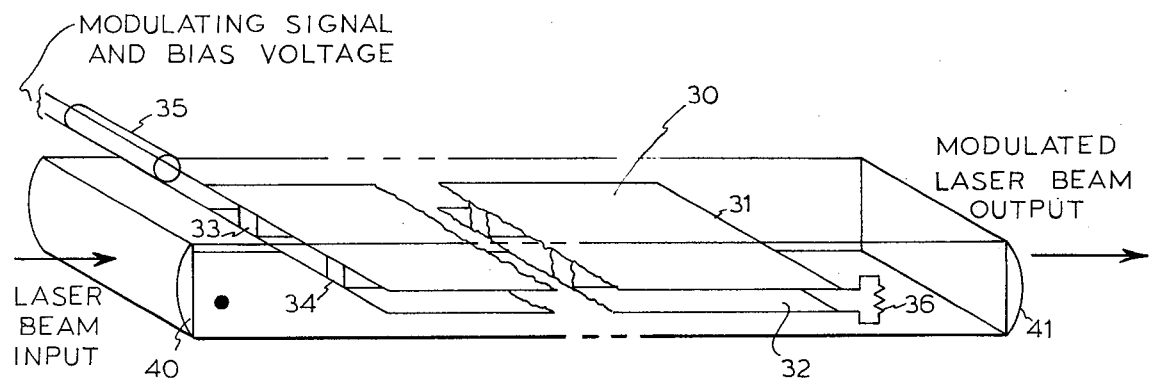
FIG. 5 shows a preferred embodiment of the invention.

Referring now to FIG. 5, an exemplary embodiment is shown of an electrooptic modulator of a $CO_2$ laser by means of the Stark-effect in $NH_2D$. This embodiment uses a stripline electromagnetic waveguide 30 comprised of parallel conductive strips 31 and 32 spaced apart (about 1 millimeter) by parallel dielectric spacers 33 and 34 made of infrared light reflecting material, such as quartz, thus forming a rectangular waveguide for the infrared laser beam.

The modulating signal and bias voltage is applied through a coaxial cable 35 to the conductive strips 31 and 32 at the front end where the laser beam enters the waveguide 30. A matched load or termination 36 is connected to the exit end of the waveguide to completely absorb the incedent electromagnetic power. The termination may take the form of a suitable resistor connected between the conductive strips at each corner of the exit end, or any other arrangement which permits absorption of the electromagnetic energy without absorbing any of the light energy.

A cylindrical lens 40 at the front end of the assembly converts the incident infrared light from a pencil beam or collimated bundle (of about 3 mm in diameter at the half power points) to a sheet of collimated infrared light focused at the entrance of the waveguide 30. A cylindrical lens 41 at the exit end of the assembly returns the sheet of collimated light to a pencil beam of collimated and modulated light.

The entire assembly is enclosed, and the enclosure is filled with deuterated ammonia. The enclosure may consist of sheets of suitable material here represented by lines connecting corners of the lens 40 to corresponding corners of the lens 41. If the enclosure is in fact implemented in that way, the two cylindrical lenses will serve as the windows for the enclosure.

What is claimed is:

1. A method for phase or amplitude modulation, including Q-switching, of the beam of a $CO_2$ laser using a Stark-effect cell, said cell having two electrical plates disposed parallel to said beam, one plate on each side of said beam, said method being comprised of:
    evacuating said cell;
    mixing approximately equal parts of $NH_3$ and $ND_3$ in said cell after evacuation to produce $NH_2D$ molecules in said cell;
    applying a DC voltage to said plates to produce a DC bias field across $NH_2D$ molecules between said plates to shift a Stark-component of said $NH_2D$ molecules into coincidence with part of the line spectrum of said laser; and
    superimposing a voltage signal on said DC voltage applied to said plates to achieve modulation.

2. A method as defined in claim 1 wherein said voltage superimposed on said DC voltage is an AC voltage.

3. A method as defined in claim 1 wherein said DC voltage is selected to bring the absorption line of said $NH_2D$ molecules into coincidence with the strong $10.6\mu$, P(20) line of said $CO_2$ laser.

4. A method as defined in claim 2 wherein said DC voltage is about 3.8 kilovolts per centimeter of space between said plates and said space is about 1 mm.

5. A method as defined in claim 4 wherein said voltage superimposed on said DC voltage is an AC voltage.

6. A method as defined in claim 5 wherein said AC voltage is about 20 volts RMS, and wherein the mixture of $NH_3$ and $ND_3$ in said cell is at a pressure of about 4 torr to achieve about 40 percent modulation.

7. Apparatus for frequency or amplitude modulation of the beam of a $CO_2$ laser comprising:
    a Stark-effect cell external to said laser, said cell being positioned in the path of said laser beam with two electrical plates spaced apart and disposed parallel to said beam, one plate on each side of said beam, and said cell being filled with a mixture of $NH_3$ and $ND_3$ to produce $NH_2D$ molecules in said cell;
    means for applying a DC voltage to said plates to produce a DC bias field across $NH_2D$ molecules between said plates, thereby shifting a Stark-component of said $NH_2D$ molecules into coincidence with part of the line spectrum of said laser; and means for superimposing a voltage signal on said DC voltage applied to said plates to achieve modulation.

8. Apparatus as defined in claim 7 wherein said voltage superimposed on said DC voltage is an AC voltage.

9. Apparatus as defined in claim 7 wherein said DC voltage is selected to bring the absorption line of said $NH_2D$ molecules into coincidence with the strong $10.6\mu$, P(20) line of said $CO_2$ laser.

10. Apparatus as defined in claim 9 wherein said DC voltage is about 3.8 kilovolts per centimeter of space between said plates, and said space is about 1 mm.

11. Apparatus as defined in claim 10 wherein said voltage superimposed on said DC voltage is an AC voltage.

12. Apparatus as defined in claim 11 wherein said AC voltage is about 20 volts RMS, and wherein the mixture of $NH_3$ and $ND_3$ in said cell is at a pressure of about 4 torr to achieve about 40 percent modulation.

13. Apparatus for modulation of the beam of a $CO_2$ laser comprising:

a Stark-effect cell external to said laser, said cell being comprised of an enclosure filled with a mixture of $NH_3$ and $ND_3$ to produce $NH_2D$ molecules in said enclosure, said enclosure having windows at opposite ends to pass said laser beam, and a stripline electromagnetic waveguide consisting of two parallel conductive strips with parallel dielectric spacers of infrared light reflecting material to form a rectangular waveguide for said laser beam, said rectangular waveguide being disposed in said enclosure to pass said laser beam from one of said windows to the other window;

means for applying a DC voltage to said parallel conductive strips to produce a DC bias field across $NH_2D$ molecules between said strips, thereby shifting a Stark-component of said $NH_2D$ molecules into coincidence with part of the line spectrum of said laser;

means for feeding an alternating signal to said stripline electromagnetic waveguide for propagation as a traveling wave of electromagnetic energy between said strips from one end thereof proximate said one of said windows to the other end thereof; and means for absorbing substantially all of said electromagnetic energy at said other end of said electromagnetic waveguide.

14. Apparatus as defined in claim 13 wherein said DC voltage is selected to bring the absorption line of said $NH_2D$ molecules into coincidence with the strong $10.6\mu$, P(20) line of said $CO_2$ laser.

15. Apparatus as defined in claim 13 wherein said DC voltage is about 3.8 kilovolts per centimeter of space between said plates and said space is about 1 mm.

* * * * *